United States Patent [19]

Owen et al.

[11] Patent Number: 5,329,959

[45] Date of Patent: Jul. 19, 1994

[54] LOCKING DEVICE

[75] Inventors: Charles D. Owen, Houston; Michael E. Rembert, Cypress; Albert S. Davis, Richmond, all of Tex.

[73] Assignee: Bettis Corporation, Waller, Tex.

[21] Appl. No.: 968,364

[22] Filed: Oct. 29, 1992

[51] Int. Cl.⁵ .................... F16K 5/08; F16K 35/00; F16K 51/00
[52] U.S. Cl. ..................... 137/315; 251/92; 251/286; 251/288
[58] Field of Search ............... 251/60, 89, 89.5, 90, 251/91, 92, 93, 110, 285, 286, 288; 137/315

[56] References Cited

U.S. PATENT DOCUMENTS

| | | | |
|---|---|---|---|
| 1,931,419 | 10/1933 | Thrush | 251/285 |
| 1,943,865 | 1/1934 | Hennessey | 251/285 |
| 2,493,966 | 1/1950 | Hartley | 251/285 |
| 4,483,513 | 11/1984 | Summers | 251/308 |
| 5,116,018 | 5/1992 | Friemoth et al. | 251/90 |
| 5,139,230 | 8/1992 | Lester | 251/285 |

FOREIGN PATENT DOCUMENTS

0350596 1/1990 European Pat. Off. ........... 251/285

*Primary Examiner*—George L. Walton
*Attorney, Agent, or Firm*—Robert W. B. Dickerson

[57] ABSTRACT

A device for controlling the rotation of a valve and/or valve actuator, such device including a housing secured to said valve and actuator, hub member rotatably received by said housing, at least one stop member receiving device provided said housing, and at least one stop member engageable surface provided said hub.

1 Claim, 7 Drawing Sheets

LOCKING DEVICE

BACKGROUND OF THE INVENTION

Many different types of valves are used to control the flow of fluids through a pipe. Usually, some kind of actuator or control is used to regulate the opening and closing of such valves. In many, if not most cases, the actuator will cause rotation of the valve shaft or stem, thereby effecting the valve's opening or closing. In some instances, it is desirable to restrict valve motion by locking it in its open or closed position. Reasons therefore may include the need for system maintenance, repair, or performance testing. Additionally, it may be desirable to test a valve's operability, such as in circumstances wherein a valve is called upon to function only rarely. An example may be in the case of emergency shut down valves (ESV). Applicant's device was designed to accomplish both of these goals, i.e., to permit locking a valve in its open and/or its closed position and to test the operability of an associated valve.

SUMMARY OF THE INVENTION

The locking device includes a housing which is adapted to be removably interposed between a valve and a valve actuator. The housing may include as many as 4 bosses or lug extensions spacedly positioned therearound. A hub is rotatably supported by said housing. A male fastener, or stem portion of said hub, normally keyed, extends within, and is turned by, a mating member, or hub, of the actuator. The actuator hub normally would possess a key or key way. The locking device hub includes a central passageway for receiving and keying to a valve stem, for rotation thereof. Said locking device hub also includes one or more radially extending wings or lugs. One or more stop screws would adjustably pass through its respective housing boss, so as to be removably engageable with a surface of one of said locking device hub wings. Likewise, one or more test pins would also be removably insertable through an aperture in its respective one of said housing bosses. When fully inserted therein, the test pin would be in a blocking position relative to said wings.

DESCRIPTION OF THE DRAWINGS

FIG. 4-A, 4-B, 4-C and 4-D are schematics illustrating different positions and functions of the locking device hub, stop screw and test pin;

FIGS. 7-A and 7-B, respectively, are detailed horizontal sections of the test pin receiving housing boss with first the test pin and then the plug inserted thereon.

DESCRIPTION OF THE PREFERRED EMBODIMENT

Figure 1:
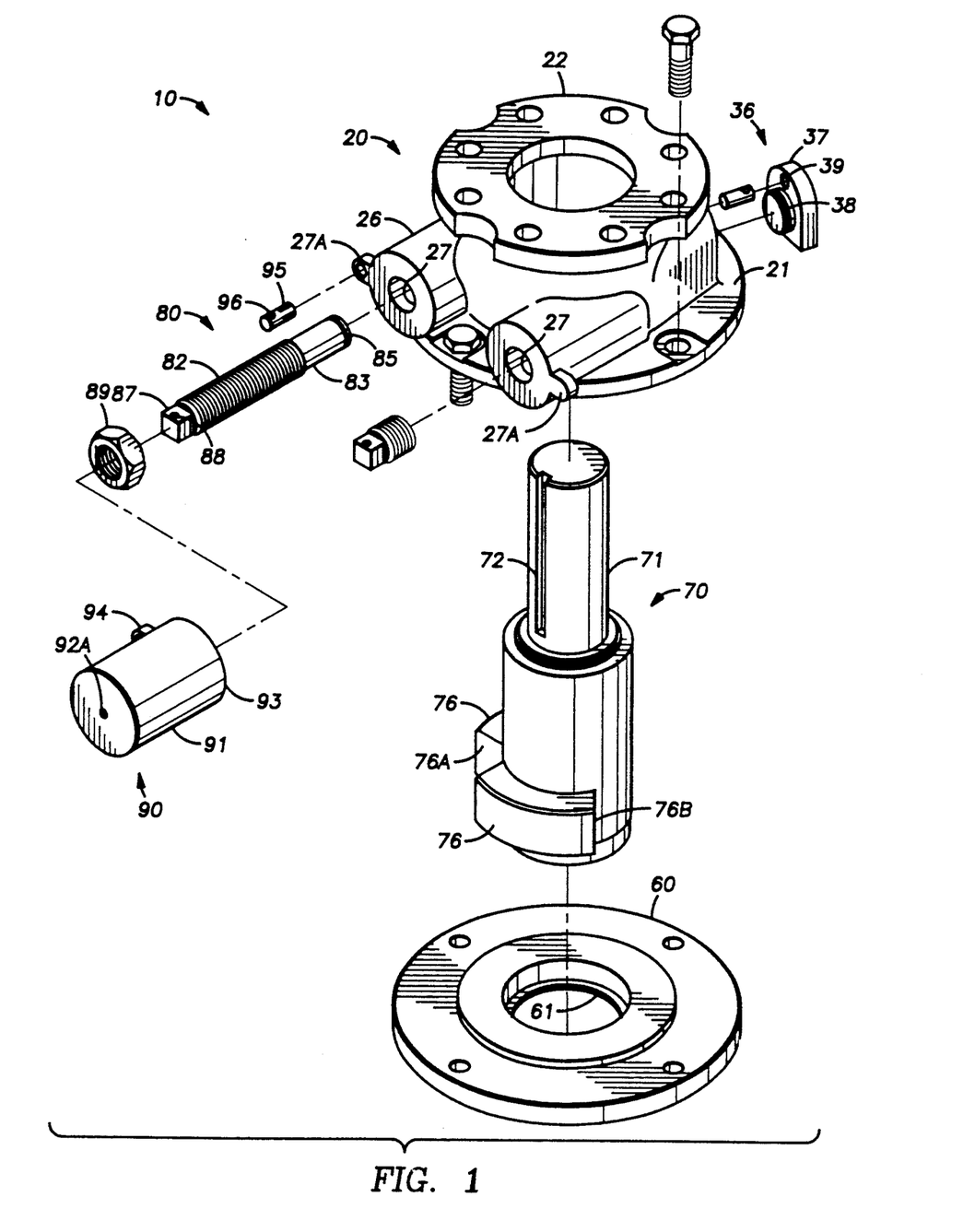
FIG. 1 is an exploded perspective of the locking device housing and hub.
Figure 2:
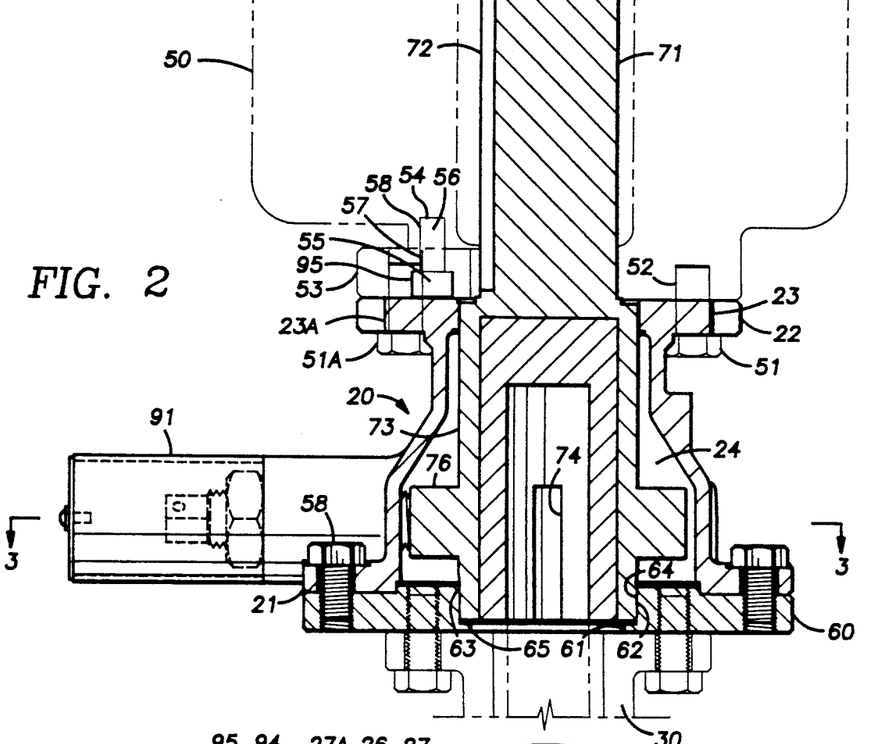
FIG. 2 is a vertical section through the assembled locking device housing and hub.

The locking device of this invention, illustrated generally by the numeral 10, is depicted in an exploded fashion in FIG. 1. It includes a housing 20, which has a central cavity 24, a first annular or circumferential flange 21 at one end, deemed the valve end, and a further such flange 22 at the opposite end, deemed the actuator end. Flange 22 is removably linked to an actuator, generally designated 50. Such linkage may be direct, as by bolts 51 passing through bolt holes 23 in flange 22 and engaging threaded apertures 52 in the body of said actuator, as shown in the right-hand portion of FIG. 2. Or, similar bolts 51A may pass through bolt holes 23A and engage in threaded apertures in adapter plate 53, as illustrated in the left-hand portion of said figure. In this latter arrangement, additional bolts 54 would have their heads 55 positioned in recessed taps 95 provided adapter plate 53. Threaded bolt stems 56 would then pass through the adapter plate's communicating passageways 57 and engage matingly threaded bolt holes 58 in said actuator body. Thus any adapter plate 53 may have two circles of bolt holes. This arrangement, use of an adapter plate, would generally be used when the actuator housing geometry and that of flange 22, are not directly compatible.

Likewise, flange 21 at the valve end of locking device housing 20, may be linked to the valve housing via mounting plate 60. Bolts 58, would link flange 21 to plate 60, similar and bolts, not numbered releasably secure plate 60 to the housing of valve 30.

Figure 9:
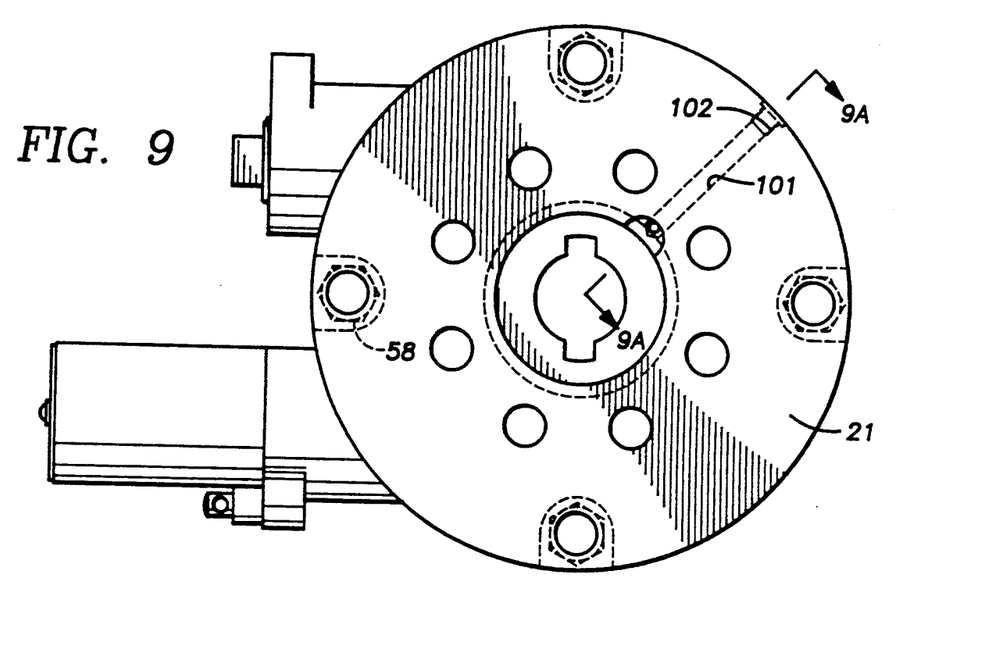
FIG. 9 is a bottom plan view of the mounting plate attached to the housing, as seen in the direction of arrows 9—9 of FIG. 5.
Figure 9A:
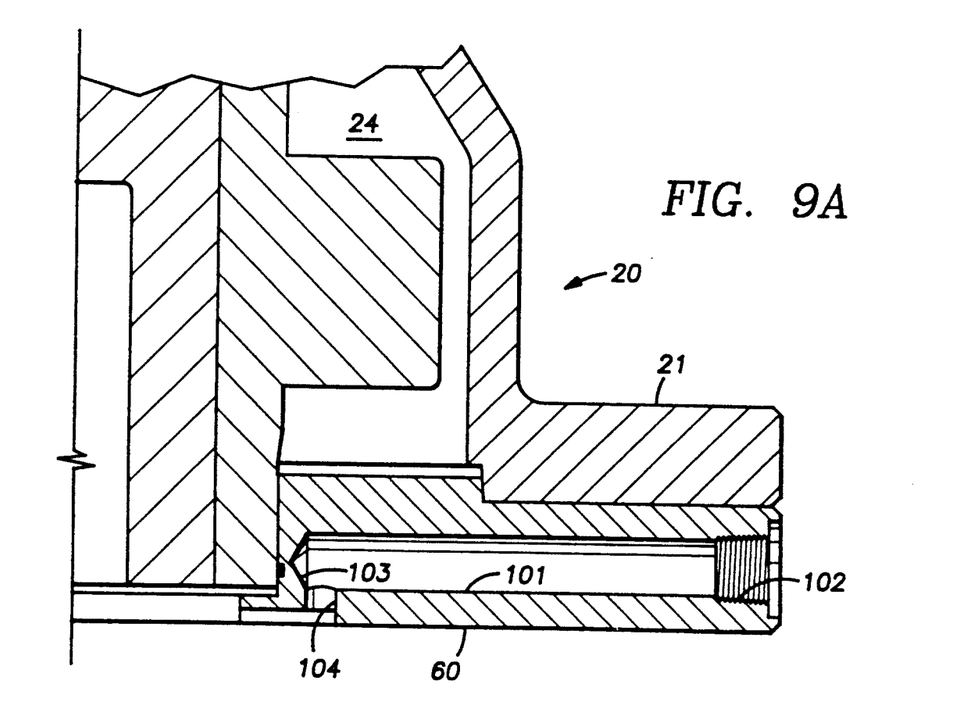
FIG. 9A is a partial section taken along lines 9A—9A of FIG. 9.

Plate 60 is centrally bored at 61, and includes stepped, communicating counterbores 62, and at 63, the latter of which positions a bearing at 64, the bearing not specifically depicted. Shoulder 65, communicating between bore 61 and counterbore 62 receives a thrust washer, not numbered. Plate 60 (see FIGS. 9 and 9A) also includes radial passageway 101, threaded at one end 102, to receive a snubber valve 40, and communicating at its other end 103, via axial passageway 104, with the interior of valve 30. Such snubber valve relieves excess pressure that may tend to build up interior of the valve.

Hub 70, includes adjacent male and female portions. The former comprises stem 71, carrying key way 72 thereon, for rotational engagement with a key which either forms a part of the hub of the valve actuator 50 or of an adapter (not shown) provided therefor. The said female portion comprises a hollow skirt 73, depending from stem 71. This female coupling or a locking hub provided therefor, may possess an internal key way 74, for rotational engagement with the keyed stem of valve 30. The valve end of hub 70 is rotatably positioned astride the thrust washer whose location is defined by shoulder 65.

Radially and outwardly extending from skirt 73 of the hub or drive bushing 70 is one or more (preferably two) wings or lugs 76. Each such wing includes opposed stop surfaces 76A and 76B, which oscillate within housing cavity 24.

Figure 3:
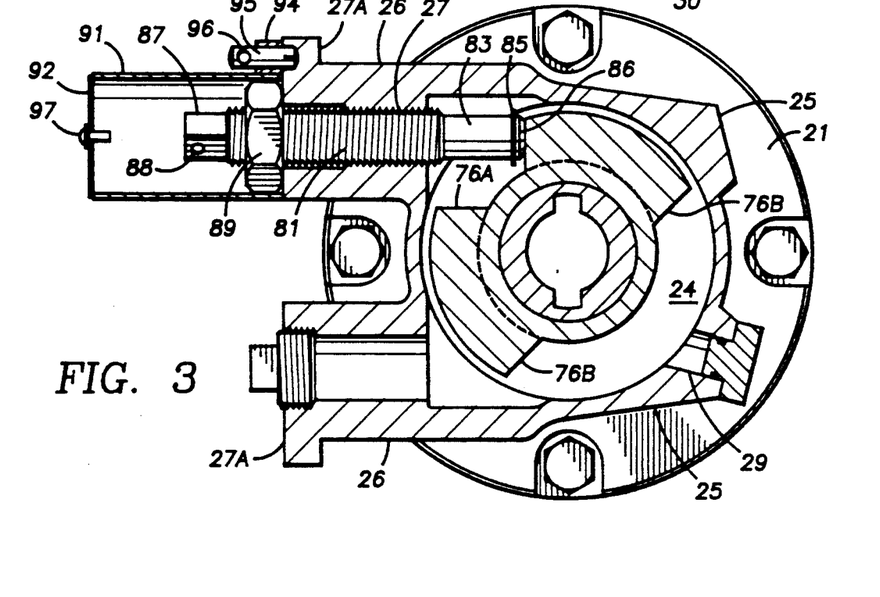
FIG. 3 is a section taken along lines 3—3 of FIG. 2.

Especially by seeing a radial section of the locking device housing 20, as in FIG. 3, opposed pairs of bosses or stub extensions 25, 26 extend radially outward from the bell housing 20. The former pair may have test pin passageways 29 therethrough, in communication with housing cavity 24. The latter pair of more axially extended bosses 26 may each include a partially threaded lock screw passageway 27 therethrough, and a depending ear 27A.

Lock screw 80 includes central body 81 having exterior threads 82 therearound, for adjustable engagement with the interior threads of passageway 27. Reduced diameter nipple 83 includes an annular recess for receiving retainer ring 85, adjacent the flattened, stop-engaging, end 86. Opposite said end 86, cube-shaped tail 87 depends from central body 81, said tail having lateral, tool engageable, aperture 88 therethrough. Jam nut 89 is threadedly engageable with lock screw threads 82.

Lock screw cover 90 includes cylindrical cup 91 with a pin-engageable aperture 92A through its web 92. Positioned laterally and adjacent to said cups open end 93, and rigidly secured thereto, is pin-receiving, ring member 94. The counterpart drive pin 95 includes a lateral, lock receiving aperture 96, near one end, and a plurality of axially parallel fins spaced around the pin's periphery. This permits the pin to be securely driven into a tap 27B in depending ear 27A. A pin 97 may be fitted within aperture 92A, and have a flexible cable (not shown) linked to another pin (not shown) which in turn would be secured to housing 20.

Test pin 30 is flattened at one end 31, includes a tool receiving, threaded tap 32 at its other end, has a radially extending aperture 33 therethrough near said tap, and has an annular recess 34 therearound for receiving a retainer ring 35. Test pin passageway plug 36 includes body portion 37, having depending lug extension 38, drive pin aperture 39 therethrough, and tap 39A.

Figure 8:
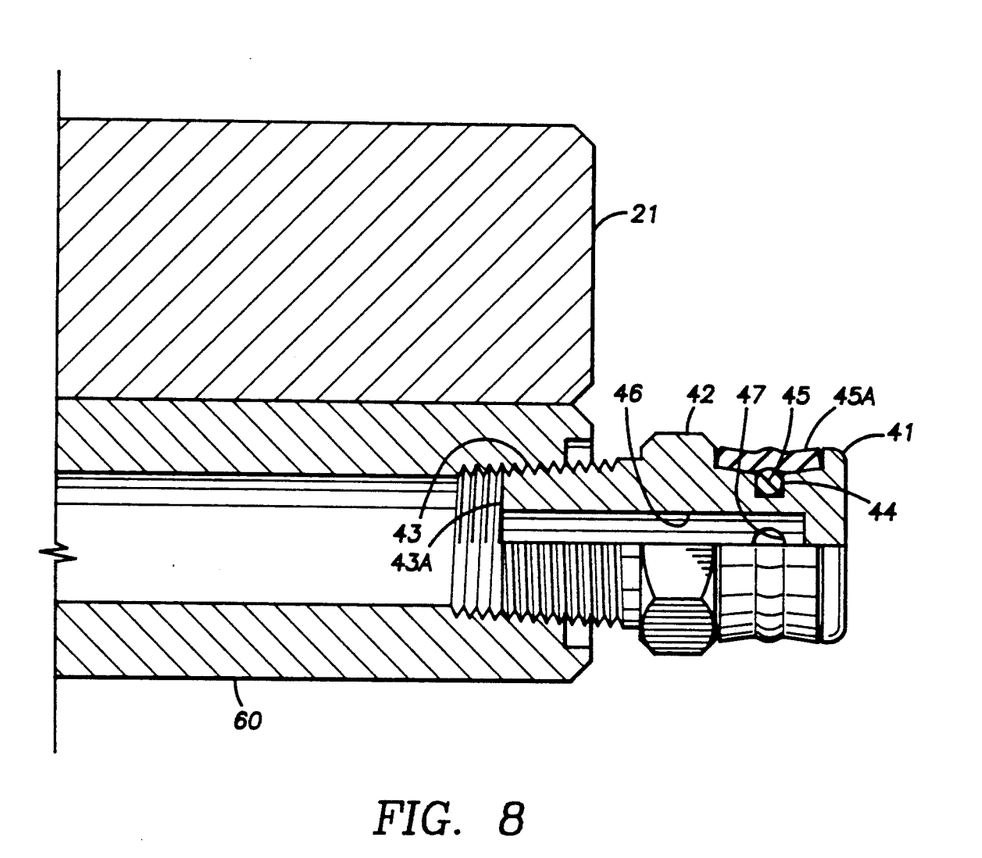
FIG. 8 is a vertical axial section through the snapper valve.

The snubber valve includes head 41, hexagonal girdle 42, threads 43 at end 43A, annular groove 44 intermediate members 41 and 42, O-ring 45 in grove 44, flexible neoprene mask 45A, and axial bore 46 in communication with radial passageway 47, which exhausts into groove 44, to atmosphere.

Consider now the installation and operation of the device. It is intended to restrict rotation of the valve and/or actuator. The locked mode may be used if the actuator must be removed or to ensure that the valve remains in the desired position during maintenance operations.

The locking device can function in either the locked mode or the test stop mode. When the unit functions as a locking device the test stop pins must be removed from the housing. If it is desired to use the unit in the test stop mode then the stop screws must be in the fully retracted position.

OPERATION IN THE LOCKING DEVICE MODE

The principal purpose of the locking device is to restrict rotation as shown in the attached diagrams of FIGS. 4A–4D. The locking device is independent of the actuator. The actuator may be removed from the locking device without disturbing the locking device. The locking device is engaged by rotating the stop screw 80 until the screw end 86 contacts a lug 76 on the hub or drive bushing 70. Tightening the jam nut 89 on the stop screw prevents unintentional movement of the stop screw. The locking device is disengaged by rotator the stop screw 80 until the stop screw loses thread engagement in the housing lock screw passageway 27. When in the disengaged mode the stop screw is prevented from coming out of the housing by retainer ring 85. In either the engaged or disengaged mode tampering is prevented by locking the stop screw cover to the housing. Pin 95 is driven into the tap 27A. A padlock may then insure against removal by insertion through aperture 96.

With the cover locked in place the stop screw cannot be engaged by hand or with any tool. Therefore the stop screw position cannot be changed. The stop screw cover can be moved to allow access to the stop screw but the cover cannot be completely removed from the housing, by virtue of the cable connecting pin 97 to housing 20. All locking device housings have a snubber valve to prevent pressure buildup inside the valve. Locking devices are not intended to lock the actuator in the spring compressed position.

OPERATION IN THE TEST STOP MODE

Figure 4A:
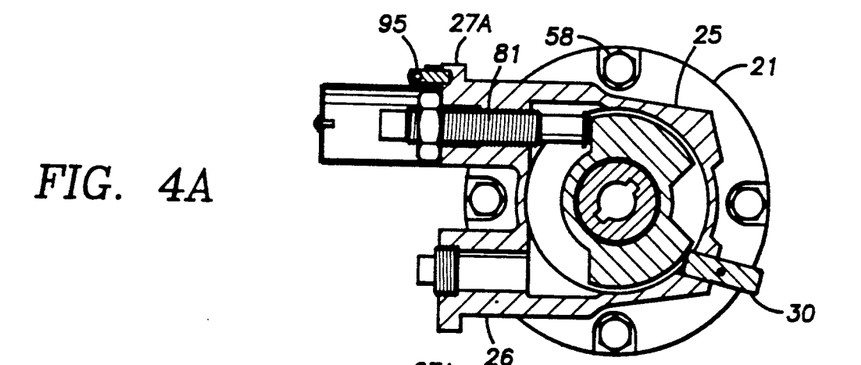
Figure 4B:
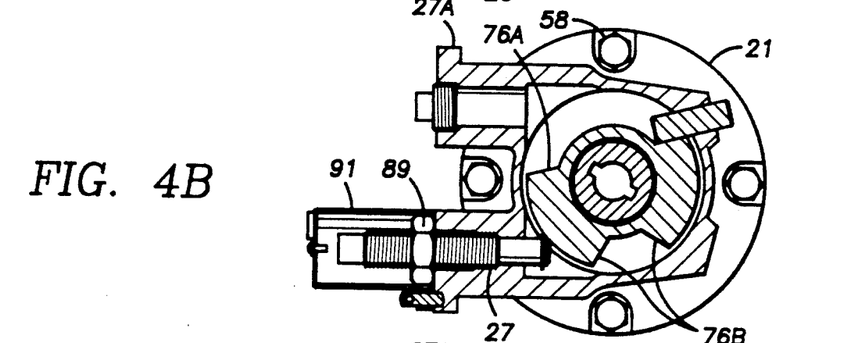

The purpose of the test stop is to limit rotation as shown in the attached diagram of FIG. 4B. by inserting the test stop pin 30 into the appropriate test pin passageway 29 until retainer ring 35 limits further insertion. If it is desired to operate with the test stop disengaged the stop pin should be removed and the test stop pin cover 36 be locked in place, by inserting lug 38 into passageway 29. This prevents the insertion of any object that might act as a test stop pin. The test stop pin cover cannot be installed unless the test stop pin is completely removed from the housing.

MOUNTING

The locking device can mate with the mounting and yoke bore characteristics of the actuator; that is, the locking device can fit any adapter plate and valve stem that the actuator will fit. Another way of saying this is to say that the locking device could be installed beneath substantially any existing actuator in the field without any additional hardware (locking device model appropriate for the actuator model and assuming a standard stem bore in the actuator).

ACTUATOR TO LOCKING DEVICE MOUNTING

The actuator attaches to the top flange 22 of the locking device. For some actuator models an adapter plate (which is considered to be part of the locking device) is required between the actuator and the locking device top flange. The locking device engages the standard actuator drive configuration (standard bore and key way or standard square drive shaft) and the standard actuator mounting bolt pattern.

LOCKING DEVICE TO VALVE MOUNTING

The bottom surface of the locking device is to be used as a valve mounting flange. Some of the dimensions and characteristics of the bottom plate are fixed to accommodate the bottom of the locking device while other dimensions and characteristics are specified per application to match the valve topworks. The lock hub in the locking device can be made per order to accommodate the valve stem.

The arcuate and angular placement of the test pin and stop screw bosses 25, 26, together with the positioning of lugs 76 about hub 70 of the stop device permit locking a valve in the open or in the closed position, as well as testing for valve-actuator operability from the valve open or valve closed position. Thus, the device is adaptable to a number of different configurations and suitable for a number of different purposes, i.e., it is not necessary to utilize two stop screws and two test pins in every instance.

Figure 7A:
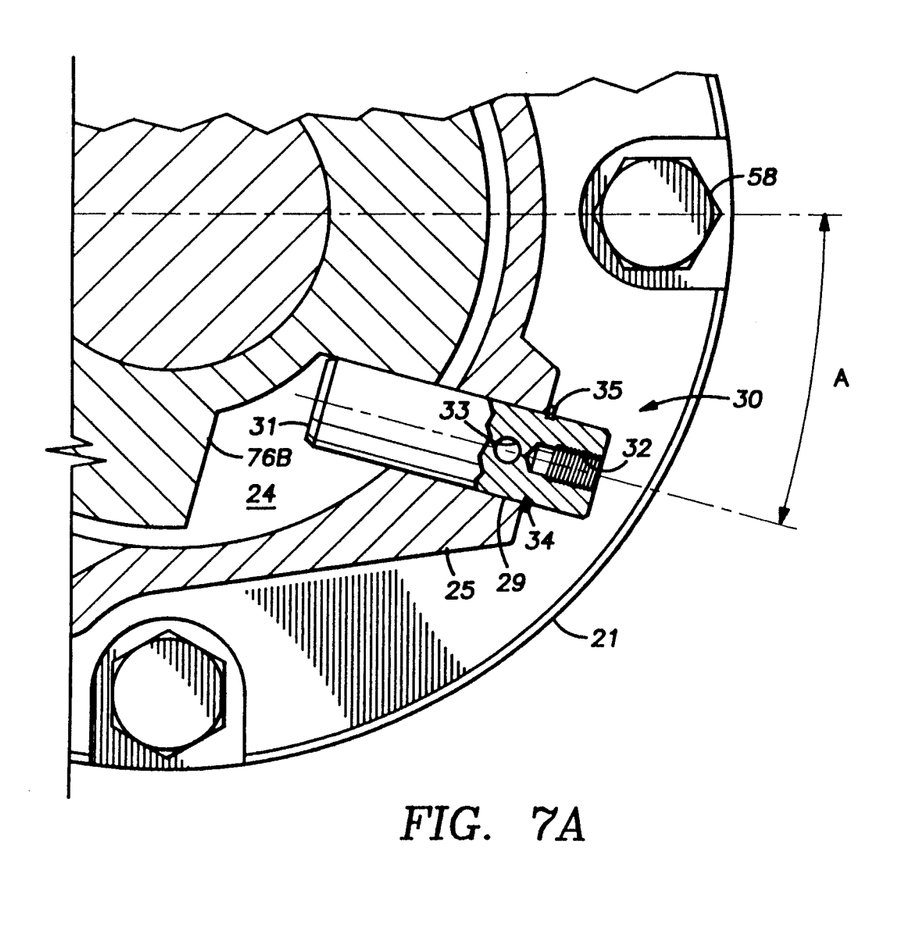
Figure 7B:
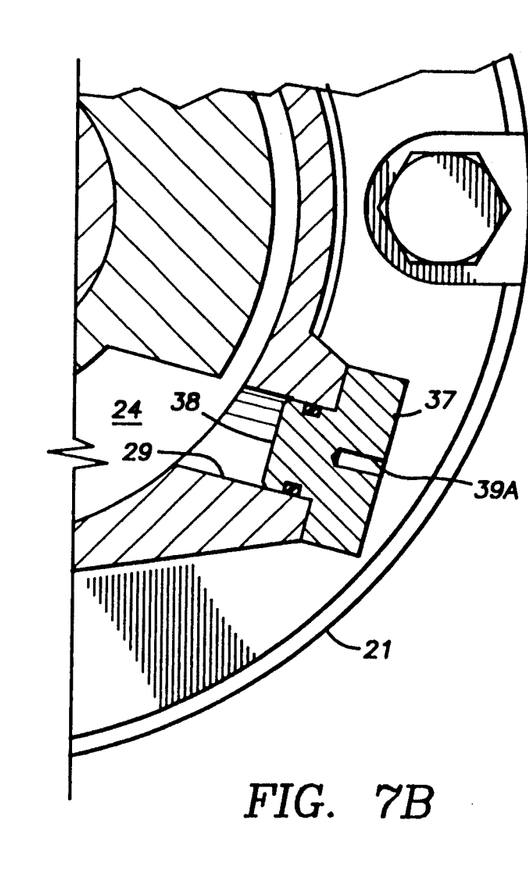

The stop screw passageways 27 are seen to be parallel to each other, and approximately equidistant and on opposite sides of the centerline of hub 70. The axis of each test pin passageway 29 is approximately 15° from the centerline of the locking device housing (see angle "A" of FIG. 7A). Another description would be that the stop screw passageways 27 are oppositely positioned, parallel to, and equidistant from a plane through the axis of hub 70, while each of test pin passageways 29 are oppositely positioned relative to said plane, and at an angle "A" (approximately 15°) from said plane.

As shown, two lugs 76 are secured to hub 70, with four surfaces presented for engagement with two stop screws 80 and/or two test pins 30. This number of lugs, stop screws and test pins may vary, depending on the particular purpose for which the device is being used. FIGS. 4A-4D illustrate a number of such purposes. In each instance, the surface of a stop lug 76 encountered by end 86 of a stop screw 80, is perpendicular to the axis of such stop screw. Adjustment of said stop screw permits adjustment of the lock position within a range of −5° to +5°. The test pin positioning permits the valve/actuator to move from its full open (90° position) or its full closed (0° position) for 15° arcuate movement before encountering and being stopped by the test pin. Recalling that counter clockwise hub rotation effects valve opening, and clockwise movement causes valve closure, then the arrangement of FIG. 4A illustrates the valve to be closed, the only lock screw is engaged, the only test screw is disengaged, and any opening torque is being resisted.

In the arrangement of FIG. 4B the only lock screw is disengaged, the only test pin is engaged, opening torque is being resisted.

Figure 4C:
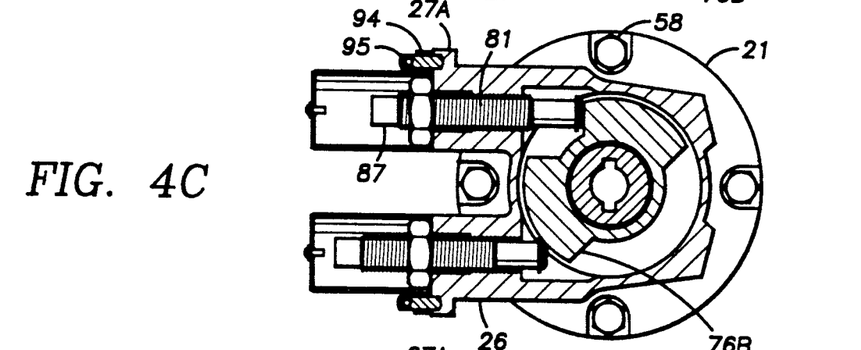

In FIG. 4C, one stop screw is engaged, and one disengaged. No test pin is engaged. The valve is in the closed position and opening torque is resisted.

Figure 4D:
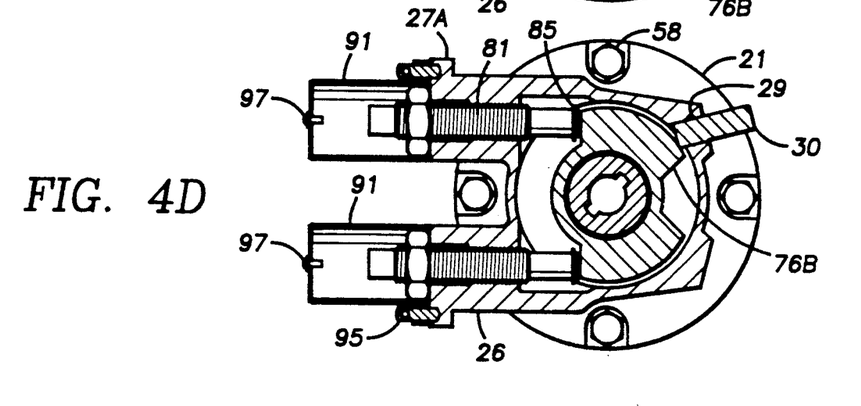
Figure 5:
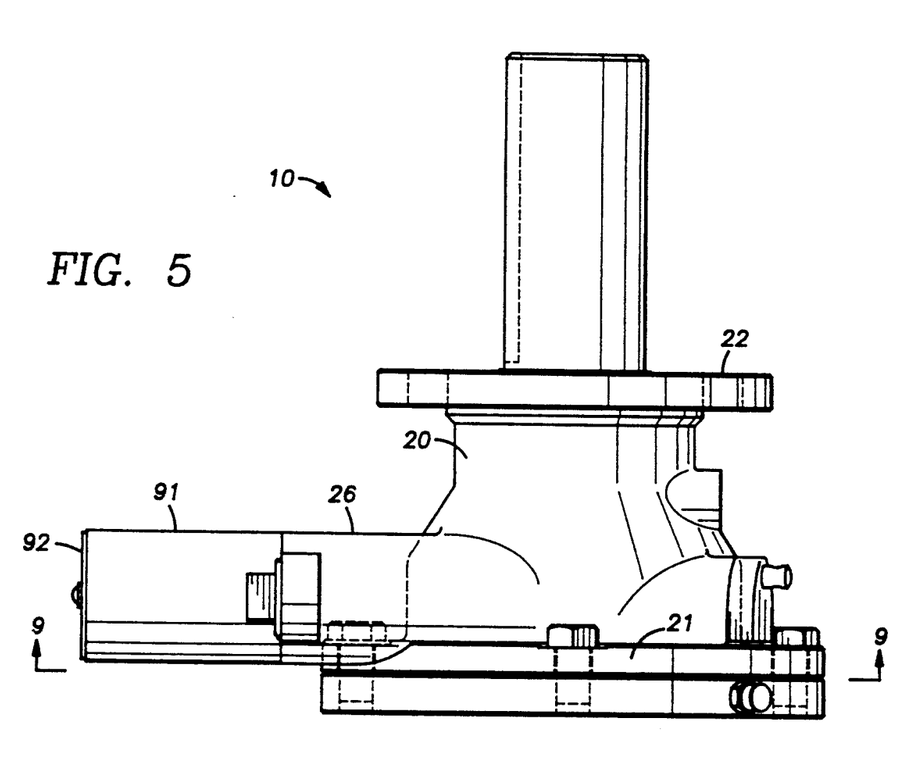
FIGS. 5 and 6, respectively, are side elevation and plan views of the assembled housing and hub.
Figure 6:
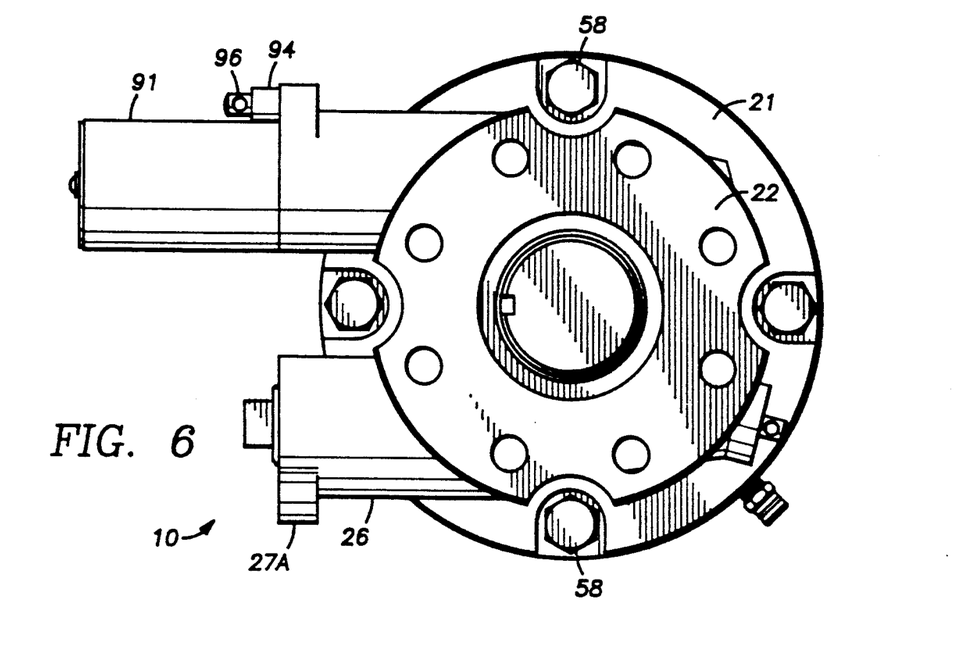

In FIG. 4D, both stop screws are shown engaged. Both opening and closing torque would be resisted. The one test pin is disengaged, and, in fact, should be removed.

Although limited variations have been illustrated, it should be obvious that numerous modifications would be possible by one skilled in the art without departing from the spirit of the invention, the scope of which is limited only by the following claims.

We claim:

1. A combination valve locking and testing device linking a valve and a valve actuator, said valve being movable between an open and a closed position, said combination device comprising:

housing member releasably secured to both said valve and said actuator, said housing member being bored for oscillatably receiving a hub member; oscillatable hub member having engagement means engageable with both said actuator and with said valve's stem for translating actuator motion into valve motion between said open and closed positions;

lug means depending from said hub member, and movable therewith, said hub means presenting at least one surface engageable with a stop member and at least one surface engageable with at set member;

said housing member including an opposed pair of threaded stop member receiving aperture means through said housing in communicating relationship with said housing bore, each said stop member receiving aperture means being parallel to and substantially equidistant from a plane through the axis of said hub; said housing member further including an opposed pair of test member receiving aperture means through said housing in communicating relationship with said housing bore said pair of test member receiving aperture means being positioned on opposite sides of a plane through the axis of said hub, and in non-parallel relationship with said plane; at least one stop member being adjustably receivable by at least one of said stop member receiving aperture means through said housing, each said stop member including means for adjustably, and substantially orthogonally, engaging one of said lug means' stop member engageable surfaces; and at least one test member being removably receivable by said test member receiving aperture means, each said test member including means for engaging at least one of said lug means' test member engageable surfaces, and being adapted to, when fully received by its associated aperture means, block oscillation in one direction by said hub member after said hub rotates in an incremental amount from either of its associated valve open and valve closed position, and such that the force exerted against said test member by said associated stop surface is lateral whereby the valve's operability may be tested in both its open and closed positions.

* * * * *

UNITED STATES PATENT AND TRADEMARK OFFICE
CERTIFICATE OF CORRECTION

PATENT NO. : 5,329,959
DATED : July 19, 1994
INVENTOR(S) : Charles D. Owen, Michael E. Rembert, Albert S. Davis It is certified that error appears in the above-indentified patent and that said Letters Patent is hereby corrected as shown below:

Column 2, line 31: After "plate 60," change "similar and" to --and similar--.

Column 3, line 60: After "disengaged by "change "rotator" to --rotating--.

Column 6, line 12: After "movable therewith, said" change "hub" to --lug--.

line 14: After "engageable with" change "at set" to --a test--.

Signed and Sealed this

Sixth Day of September, 1994

*Attest:*

BRUCE LEHMAN

*Attesting Officer*  *Commissioner of Patents and Trademarks*